United States Patent
Arimatsu et al.

(10) Patent No.: US 9,065,314 B2
(45) Date of Patent: Jun. 23, 2015

(54) ROTOR OF BURIED MAGNET-TYPE ELECTRIC MOTOR, MOTOR AND MACHINE TOOL HAVING THE ROTOR

(75) Inventors: Yohei Arimatsu, Minamitsuru-gun (JP); Kenji Kawai, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 242 days.

(21) Appl. No.: 13/595,029

(22) Filed: Aug. 27, 2012

(65) Prior Publication Data

US 2013/0119817 A1 May 16, 2013

(30) Foreign Application Priority Data

Nov. 14, 2011 (JP) .................................. 2011-248958
Mar. 15, 2012 (JP) .................................. 2012-059091

(51) Int. Cl.
*H02K 1/27* (2006.01)
(52) U.S. Cl.
CPC ............ *H02K 1/276* (2013.01); *H02K 2213/03* (2013.01)
(58) Field of Classification Search
CPC ..... H02K 1/27; H02K 1/2706; H02K 1/2753; H02K 1/276; H02K 1/2766
See application file for complete search history.

(56) References Cited

U.S. PATENT DOCUMENTS

| 6,384,507 | B1 * | 5/2002 | Lee et al. ........................ 310/211 |
| 6,794,784 | B2 * | 9/2004 | Takahashi et al. ......... 310/156.53 |
| 2007/0063607 | A1 * | 3/2007 | Hattori ....................... 310/156.53 |
| 2008/0136281 | A1 * | 6/2008 | Fujii et al. ................. 310/156.08 |
| 2010/0259123 | A1 * | 10/2010 | Nishijima ................. 310/156.53 |

FOREIGN PATENT DOCUMENTS

| CN | 101272066 A | 9/2008 |
| CN | 101427444 A | 5/2009 |
| JP | 2002281700 A | 9/2002 |
| JP | 2007318880 A | 12/2007 |
| JP | 2008236890 A | 10/2008 |
| JP | 2008278553 A | 11/2008 |
| JP | 201045974 A | 2/2010 |
| JP | 2011125115 A | 6/2011 |

OTHER PUBLICATIONS

Office Action mailed Feb. 4, 2014, corresponds to Japanese patent application No. 2013-001983.

* cited by examiner

*Primary Examiner* — Michael Andrews
(74) *Attorney, Agent, or Firm* — Lowe Hauptman & Ham, LLP

(57) ABSTRACT

A rotor (10) of a buried magnet-type electric motor, wherein the magnetic poles thereof are each constituted by two rows of magnets (M1, M2) of the same pole, wherein a core portion (12) between magnet slots of the same pole is arranged between the magnet slots (31, 32) in which the two rows of magnets are arranged, and wherein, of the edges constituting said magnet slots, the portions connecting the edges (31*a*, 32*a*) on the inner side in the radial direction to the outer edges of the core portion between the magnet slots of the same pole, have curved portions (41, 42) that connect a curve of a small curvature to a curve of a large curvature starting from the edges on the inner side in the radial direction and heading toward the outer edges of the core portion between the magnet slots of the same pole.

10 Claims, 14 Drawing Sheets

ROTOR OF BURIED MAGNET-TYPE ELECTRIC MOTOR, MOTOR AND MACHINE TOOL HAVING THE ROTOR

RELATED APPLICATIONS

The present application is based on, and claims priority from, Japanese Application Number 2011-248958, filed Nov. 14, 2011, and Japanese Application Number 2012-059091, filed Mar. 15, 2012, the disclosures of which are hereby incorporated by reference herein in their entirety.

BACKGROUND OF THE INVENTION

1. Field of the Invention

This invention relates to a rotor of a buried magnet-type permanent magnet synchronous rotary electric motor. The invention, further, relates to a motor mounting the above rotor and to a machine tool mounting the above motor.

2. Description of the Related Art

A buried magnet-type synchronous motor has been widely used. Such a motor is a built-in motor which is directly incorporated in, for example, a main shaft of a machine tool to directly drive the main shaft, and is required to have a relatively large inner diameter and to rotate at a high speed.

The rotor of the built-in motor is fixed to the outer diameter portion of the main shaft, usually, by shrinkage fit. Therefore, the inner diameter of the rotor of the built-in motor is required to be nearly the same as the outer diameter of the main shaft.

Depending upon the dimensional precision and surface roughness of a workpiece that is to be machined, the main shaft of the machine tool requires a machining precision on the order of micrometers. For example the main shaft having a low rigidity undergoes vibration affecting the dimensional precision, surface roughness and appearance of the workpiece that is machined. This is attributed to low performance of the main shaft.

The rigidity of the main shaft is determined depending, for example, upon the diameter of the main shaft. Usually, the geometrical moment of area of the main shaft increases with an increase in the diameter thereof and, as a result, the main shaft has increased rigidity. Therefore, it is desired that the main shaft has a diameter which is as large as possible within a range permitted by a maximum rotational speed of the main shaft.

As described above, the rotor of the built-in motor has been directly attached to the main shaft by shrinkage fit. Therefore, the rotor of the built-in motor, is also required to have a relatively large inner diameter as the diameter of the main shaft.

In this connection, it is presumed that a hollow cylinder that serves as the rotor of the built-in motor rotates about the center axis thereof. In the case of a cylinder having the same outer diameter, the stress that generates in the cylinder increases with an increase in the inner diameter thereof. In addition, the maximum rotational speed which the rotor can withstand decreases with an increase in the stress. The same also holds for the rotor of the buried magnet-type synchronous motor; i.e., maximum stress that generates in various parts increases and a maximum rotational speed that can be permitted decreases with an increase in the inner diameter.

Therefore, as described above, the rotor of the buried magnet-type synchronous motor, specifically, the rotor of the built-in type motor incorporated in the main shaft of a machine tool, is required to satisfy the requirements of both high rotational speed and large inner diameter. However, as described above, an increase in the inner diameter is accompanied by an increase in the stress that generates due to the rotation. Therefore, it is necessary to decrease the maximum rotational speed that can be permitted to rotate. In other words, an increase in the rotational speed and an increase in the inner diameter constitute conflicting technical elements due to their own natures.

FIG. 17 is a transverse sectional view showing a representative shape of magnet slots of the buried magnet-type synchronous motor according to a prior art. In FIG. 17, eight poles comprising eight magnets M are arranged in a core 110 in the circumferential direction thereof. As shown in FIG. 17, the magnets M are arranged in the circumferential direction in a manner that the magnetic poles alternately appear like NSNS - - - . In FIG. 17, each pole is constituted by a row of magnets in the axial direction.

FIG. 18 is a partially enlarged view illustrating a pole of the motor shown in FIG. 17. As shown in FIG. 18, in general, one magnet slot 300 corresponds to one magnetic pole. The magnets M corresponding to each magnetic pole have their axial magnetic poles arranged in a row in the same direction, i.e., arranged in one magnet slot 300.

However, as the rotational speed increases, the centrifugal force also increases, and core portions at both ends of the magnets M have to bear increased strength. If the stress produced by the rotation exceeds an allowable value, then the core 110 breaks. Therefore, a limit is imposed on increasing maximum rotational speed.

To avoid this, it has been attempted to divide the magnet slot in the same pole into a plurality of magnet slots, and to arrange a core in a region between the divided magnet slots. FIG. 19 is another sectional view showing a typical shape of magnet slots in a buried magnet-type synchronous motor according to prior art. In FIG. 19, the two magnets M1 and M2 arranged in the divided magnet slots 310 and 320 constitute one pole. A core portion 120 is provided between the magnet slots 310 and 320 in which the magnets M1 and M2 are arranged, respectively. In FIG. 19, the core portion 120 increases the strength against the centrifugal force. Therefore, provision of the core portion 120 shown in FIG. 19 is sufficient when the maximum rotational speed is not very high, the inner diameter of the rotor does not have to be increased, and the stress is concentrated to a small degree.

However, with this shape, if it is required to further increase the speed or to further increase the inner diameter, then the stress further increases in the portions on the inner side of the core portions 120 in the radial direction and in the core 110 near the ends of the magnets M1 and M2, and the limitation is readily reached.

In order to solve the above problem, Japanese Unexamined Patent Publication No. 2002-281700 discloses a shape of magnet slots of the rotor of a buried magnet-type permanent magnet synchronous motor by giving attention to suppressing the stress at the time of high-speed rotation. Japanese Unexamined Patent Publication No. 2002-281700 discloses the shape of a core portion extending in the radial direction between the magnets of the same pole (hereinafter referred to as core portion between the magnet slots of the same pole) and the shape of vicinities thereof. According to Japanese Unexamined Patent Publication No. 2002-281700, the concentration of stress is suppressed by the core portion, and a maximum rotational speed can be increased.

When the motor rotates, the outer core portion located on the outer side of the magnet in the radial direction produces a load due to the centrifugal force generated by the mass of the magnet and the mass of the outer core portion itself. The magnitude of the load increases with an increase in the rotational speed.

In the shape of slots disclosed in Japanese Unexamined Patent Publication No. 2002-281700, the core portion between the magnet slots of the same pole shares the load produced in the radial direction by the centrifugal force. Therefore, it is possible to decrease the stress generated in the outer circumferential portion at both ends of the magnet and, as a result, to increase the rotational speed. In other words, the method disclosed in Japanese Unexamined Patent Publication No. 2002-281700 offers a certain effect for the motors that rotate at high speeds.

As described, it is often required to provide a rotor that has a further increased inner diameter and that rotates at a high speed.

If the structural strength of the rotor is considered, a core portion which is on the inner side of the magnet slot in the radial direction serves as an important portion supporting the strength. In other words, the centrifugal force due to the magnet and the core portion on the outer side of the magnet slot in the radial direction, is exerted as a load on the core portion on the inner side of the magnet slot in the radial direction.

A large inner diameter means that the core portion on the inner side in the radial direction has a small thickness in the radial direction. In other words, the structure (=core portion on the inner side in the radial direction) on which the centrifugal force finally acts) has a small sectional area. Therefore, stress is specifically high in the core portion on the inner side in the radial direction.

As described above, an increase in the inner diameter of the rotor results in a decrease in the thickness of the structure that supports the stress produced by centrifugal force. Specifically, the thickness of the core further decreases in the radial direction near the core portions on the inner side of the magnet slots in the radial direction and near the core portions between the magnet slots of the same pole. Therefore, such portions have the smallest sectional area for supporting the load produced by the centrifugal force due to rotation. Accordingly, the effect of stress distinctly appears in these portions as the inner diameter increases.

Therefore, the shape disclosed in Japanese Unexamined Patent Publication No. 2002-281700 is disadvantageous when a large inner diameter is required. Specifically, the distance from the inner circumferential surface of the core in the radial direction becomes the smallest near a corner that connects the outer edge portion of the core portion between the magnet slots of the same pole to the edge of the magnet slot on the inner side in the radial direction. In such portions, the stress easily increases if the inner diameter increases. The shape disclosed in Japanese Unexamined Patent Publication No. 2002-281700 is not sufficient for increasing a maximum rotational speed on account of the reasons mentioned below.

In Japanese Unexamined Patent Publication No. 2002-281700, the core portion between the magnet slots of the same pole has its width varying from the inner circumferential side toward the outer circumferential side as it goes, for example, from the inner circumferential side toward the outer circumferential side in the radial direction.

In other words, the width is small (narrow) at some portions and is large (wide) at other portions of the core portion between the magnet slots of the same pole. The narrow portion of the core portion between the magnet slots of the same pole suppresses the magnetic flux that passes through the core portion and closes the loop without contributing to generating torque, i.e., suppresses the leakage flux. On the contrary, the wide portions of the core portion between the magnet slots of the same pole have the magnets contacting thereto, thus, it is possible to determine the positions of the magnets in the direction of rotation, so that the magnets do not move while rotating.

In Japanese Unexamined Patent Publication No. 2002-281700, the narrow portions and the wide portions are alternately provided in the core portion between the magnet slots of the same pole in the radial direction.

In an embodiment of Japanese Unexamined Patent Publication No. 2002-281700, for example, there are arranged a first narrow portion, a wide portion and a second narrow portion in this order on the core portion between the magnet slots of the same pole in the radial direction from the inner side thereof to the outer side thereof in the radial direction.

Further, in order to reduce the stress, an arc portion must be provided between the narrow portion and the wide portion. In general, the arc portion having a large radius is more effective in reducing the stress. According to the prior art, the core portion between the magnet slots of the same pole is formed indented and, therefore, the arc portion must be formed at the portions connecting the narrow portion to the wide portion. Therefore, a number of arc portions must be provided within a size that substantially corresponds to the thickness of the magnet. Accordingly, limitation is imposed on the radii of the arcs. Depending upon the thickness of the magnet, further, it is not often necessary to provide an arc portion of a size large sufficient for reducing the stress.

As a target maximum rotational speed increases, a larger stress is produced and the radius of the arc portion must be increased to relax the stress. In this regard, according to Japanese Unexamined Patent Publication No. 2002-281700, a maximum diameter of the arc that can be attained is determined depending upon the thickness of the magnet. Under this limitation, the upper limit of a maximum rotational speed of the rotor is determined by a maximum stress produced by the arc of a maximum diameter that is attained.

Further, according to Japanese Unexamined Patent Publication No. 2002-281700, the arc provided in the outer edge of the core portion between the magnet slots of the same pole has nearly the same size either on the side close to the rotary shaft or on the side close to the outer circumference. However, in the case of the rotor having a large inner diameter, a particularly increased force is exerted on the core portion of the magnet slots on the side of the rotary shaft, and the stress as a whole tends to increase in the core portion on the side of the rotary shaft. Therefore, even a slight change in the shape causes the stress to be easily concentrated. Therefore, consideration, must be given to concentration of stress by, for example, increasing the size of the arc close to the core portion on the side of the rotary shaft to be larger than the size of the arc provided in the outer edge of the core portion between the magnet slots of the same pole.

The present invention was accomplished in view of the above-mentioned circumstances, and provides a rotor which is capable of rotating at a higher speed maintaining stability as a result of suppressing the stress near the bottom edge of the magnet slot on the outer edge of the core portion between the magnet slots of the same pole, provides a motor mounting the above rotor, and provides a machine tool mounting the above motor.

SUMMARY OF THE INVENTION

In order to achieve the above-mentioned object according to a first aspect, there is provided a rotor of a buried magnet-type electric motor, wherein the magnetic poles of the rotor are each constituted by two rows of magnets of the same pole; wherein a core portion between magnet slots of the same pole is arranged between the magnet slots in which the two rows of magnets are arranged; and wherein, of the edges constituting the magnet slots, the portions connecting the edges on the inner side in the radial direction to the outer edges of the core portion between the magnet slots of the same pole, have curved portions that connect a curve of a small curvature to a curve of a large curvature starting from the edges on the inner side in the radial direction and heading toward the outer edges of the core portion between the magnet slots of the same pole.

A second aspect is related to the first aspect, wherein the curved portions are constituted by a plurality of continuing arcs having radii that start decreasing from the edges on the inner side in the radial direction toward the outer edges of the core portion between the magnet slots of the same pole.

A third aspect is related to the first aspect, wherein the curved portions are constituted by a plurality of arcs or curves and at least one straight line, the plurality of arcs or curves having curvatures that start increasing from the edges on the inner side in the radial direction toward the outer edges of the core portion between the magnet slots of the same pole.

A fourth aspect is related to any one of the first to third aspects, wherein of the edges constituting the magnet slots, the edges on the outer side in the radial direction include protruding portions or steps extending toward the edges on the inner side in the radial direction.

According to a fifth aspect, there is provided an electric motor mounting the rotor of any one of the first to fourth aspects.

According to a sixth aspect, there is provided a machine tool mounting the electric motor of the fifth aspect.

According to a seventh aspect, there is provided a rotor of a buried magnet-type electric motor, wherein the magnetic poles of the rotor are each constituted by two rows of magnets of the same pole; wherein a core portion between magnet slots of the same pole is arranged between the magnet slots in which the two rows of magnets are arranged; and wherein protruding portions are formed on one edge of the magnet slots to extend toward the other edge of the magnet slots and to position the magnets in the magnet slots; and wherein at least one partially protruding portion is formed on the protruding portion so as to further partly protrude from a tip end of the protruding portion along one edge of the protruding portion that is not neighboring the magnet.

An eighth aspect is related to the seventh embodiment, wherein the partly protruding portions include a tilted edge that is tilting in the direction of thickness of the magnet or a curved edge.

According to a ninth aspect, there is provided an electric motor mounting the rotor of the seventh or eighth aspect.

According to a tenth aspect, there is provided a machine tool mounting the electric motor of the ninth aspect.

The above objects, features and advantages of the invention as well as other objects, features and advantages will be more obvious from the detailed description of typical embodiments of the invention shown in the accompanying drawings.

DETAILED DESCRIPTION

Figure 1:
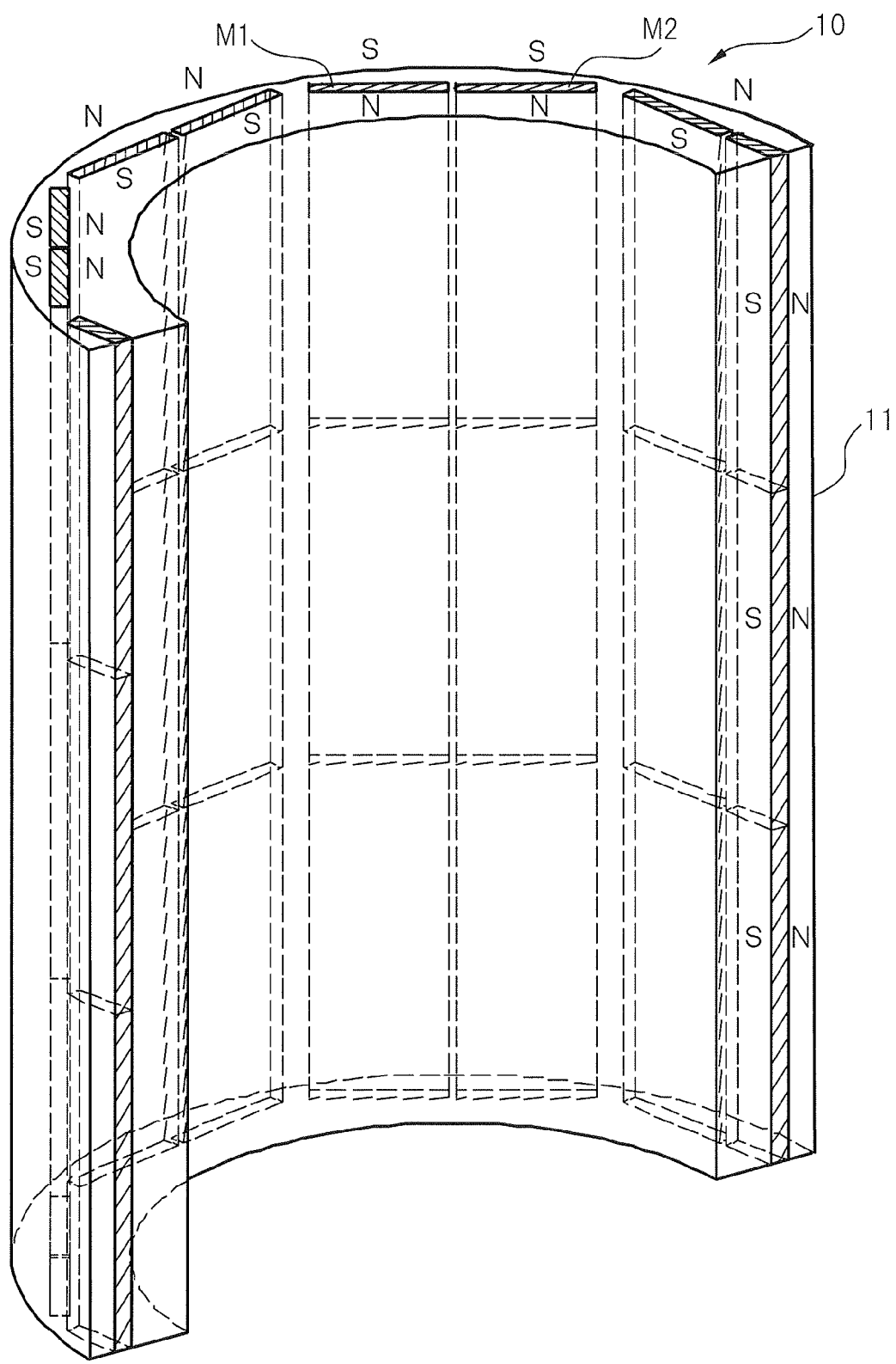
FIG. 1 is a partially broken perspective view showing a part of the core of a rotor according to the invention.

Embodiments of the invention will now be described with reference to the accompanying drawings in which the same members are denoted by the same reference numerals. For easy comprehension, the drawings are on arbitrary scales.

Figure 2:
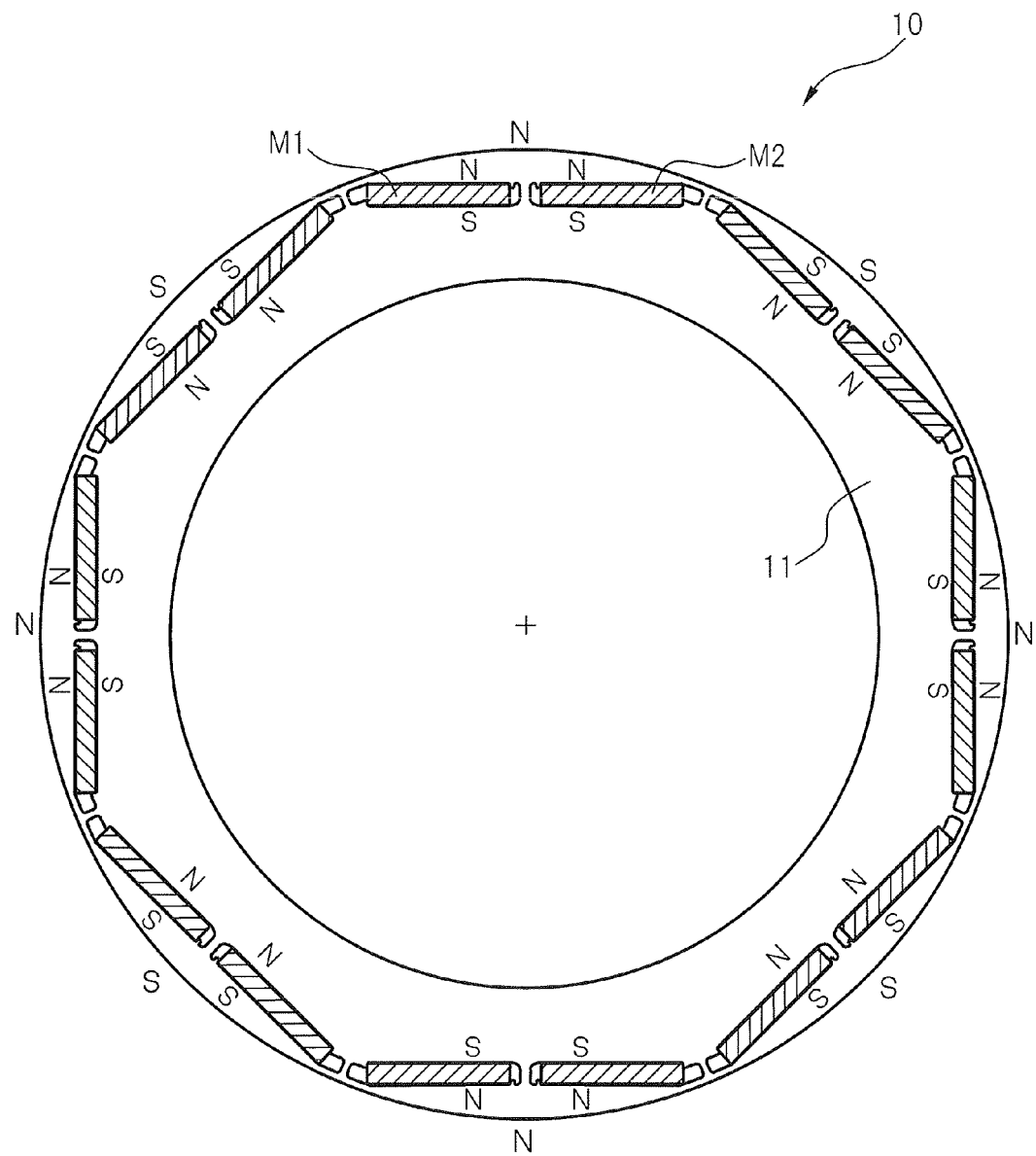
FIG. 2 is a transverse sectional view of the core of the rotor according to an embodiment of the invention.

FIG. 1 is a partially broken perspective view showing, a part of the core of a rotor according to the invention, and FIG. 2 is a transverse sectional view of the core of the rotor according to an embodiment of the invention. As shown in these drawings, the rotor 10 of an electric motor according to the invention is constituted chiefly by a core 11, and a plurality of permanent magnets M1, M2, - - - arranged in the core 11. The magnets M1, M2 have an elongated rectangular shape in cross section. FIG. 1 is not showing portions related to the embodiment of the invention.

The rotor 10 shown in FIG. 1 has eight poles, each pole including two rows of magnets M1 and M2 having the same pole. The core 11 is constituted by a laminate of electromagnetic steel plates which are fastened together as a unitary structure by such a method as adhesion, caulking, welding or by using tie bolts tightened in the axial direction. As can be seen from FIGS. 1 and 2, the rotor 10 has an inner diameter which is relatively large with respect to its outer diameter due to the requirements for the electric motor.

Figure 3:
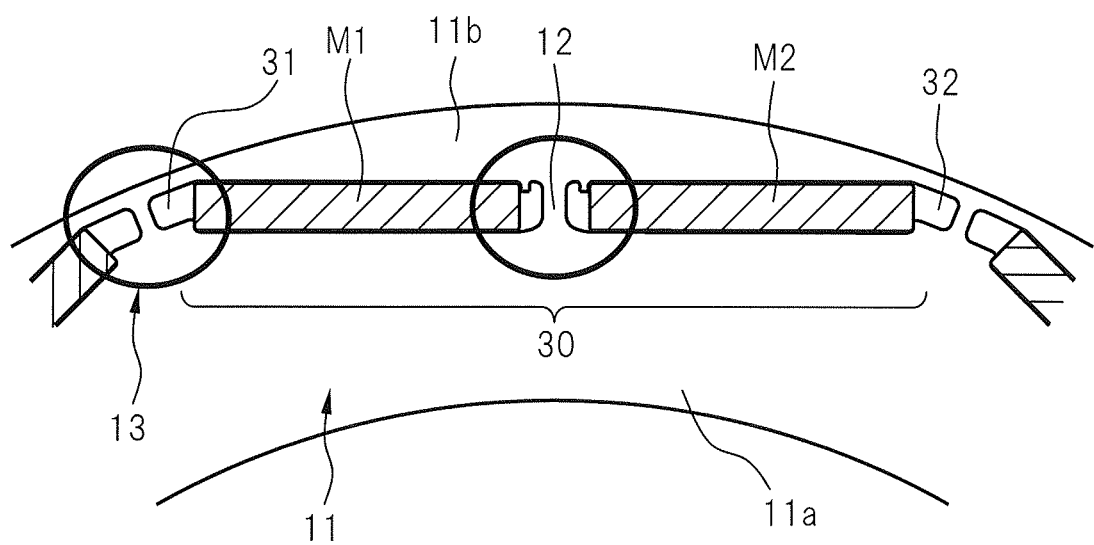
FIG. 3 is a partially enlarged view showing the rotor of FIG. 1 on an enlarged scale.

FIG. 3 is a partially enlarged view showing the rotor of FIG. 2 on an enlarged scale. As shown in FIG. 3, the magnets M1 and M2 are arranged in magnet slots 31 and 32 of a shape corresponding thereto. The magnets M1 and M2 are fixed in the magnet slots 31 and 32 by using adhesive or the like. Referring to FIG. 1 again, three magnets are arranged in each magnet slot in the axial direction. Hereinafter, the magnet slots 31 and 32 in the same pole are often referred to as "magnet slot 30 of the same pole".

Referring to FIG. 3, a core portion 12 is arranged between the magnet slots 31 and 32. When the rotor 10 rotates, the core portion 12 supports the centrifugal force exerted on an outer core portion 11b which is on the outer side of the magnets M1, M2 in the radial direction, and contributes to increasing the speed of the rotor 10 from the standpoint of structural strength. The core portion 12 passing through between the magnet slots 30 of the same pole and separating the two magnets M1 and M2 from each other, is hereinafter often referred to as "core portion 12 between the magnet slots of the same pole".

Further, the direction of rotation is referred to as transverse direction according to FIG. 3, and the radial direction is referred to as direction of thickness of the magnet. Further, in FIG. 3, the length of the magnet in the transverse direction is referred to as width of the magnet, and the length of the magnet in the radial direction is referred to as thickness of the magnet.

Figure 4A:
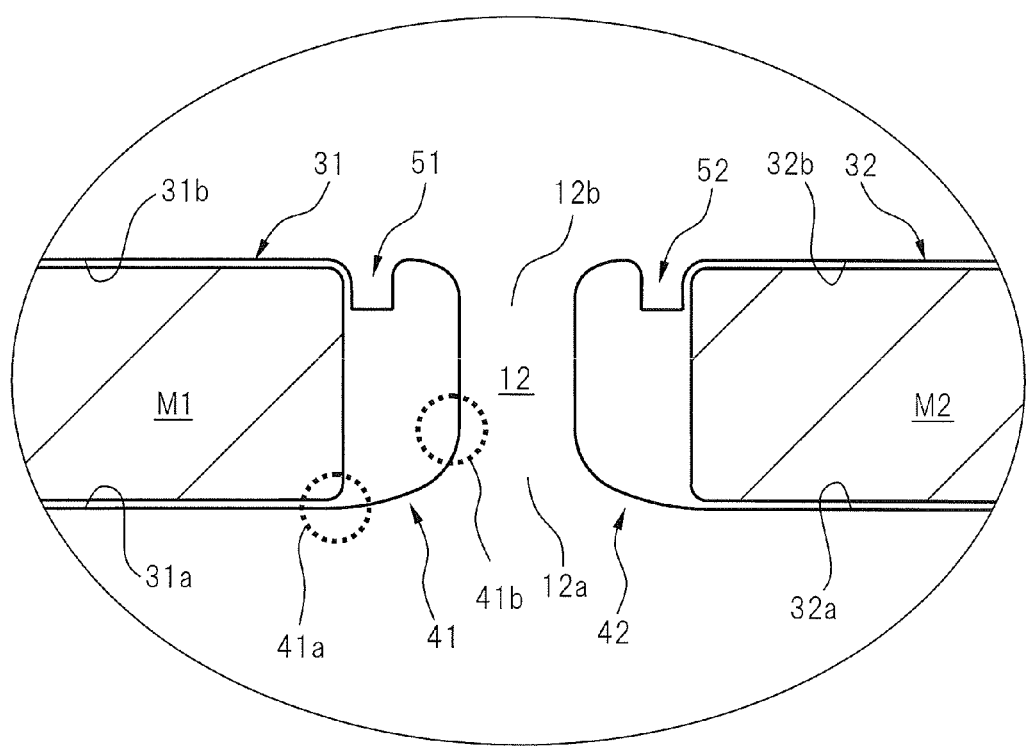
FIG. 4A is an enlarged view showing, on an enlarged scale, a core portion between magnet slots of the same pole.

FIG. 4A is an enlarged view showing, on an enlarged scale, the core portion between the magnet slots of the same pole. Referring to FIG. 4A, of the edges (long edges) of the magnet slots 31 and 32, the edges on the side of the rotary shaft in the direction of thickness of magnet are called bottom edges 31a and 32a (edges on the inner side in the radial direction). Further, of the edges of the magnet slots 31 and 32, the edges on the outer side of the rotor in the direction of thickness of magnet are referred to as upper edges 31b and 32b (edges on the outer side in the radial direction). Further, the root portion of the core portion 12 between the magnet slots of the same pole connecting to the core portion 11a on the inner side is referred to as inner root 12a of the core portion 12 between the magnet slots of the same pole, and the root portion connecting to the core portion 11b on the outer side is referred to as outer root 12b of the core portion 12 between the magnet slots of the same pole.

Referring to FIG. 3 again, there are spaces on both sides of the magnets M1, M2 in the transverse direction. The space of the core portion 13 between the different poles is formed for suppressing the leakage of magnetic flux. The space of the core portion 13 between the different poles is designed by taking into consideration a balance between the magnetic circuit characteristics and the structural strength when rotating.

One of the factors that determine a maximum rotational speed of the motor is the structural strength of the rotor 10. Usually, a maximum stress generates near the core portion 13 between the different poles or near the core portion 12 between the magnet slots of the same pole, and lowers the upper limit of rotational speed of the motor.

Of them, it has been attempted in the specification of this application to reduce the stress near the core portion 12 between the magnet slots of the same pole. Therefore, the structure is designed so that the stress is very small near the core portion 13 between the different poles.

Referring again to FIG. 4A, the magnet slots 31 and 32 include curved portions 41 and 42, respectively, extending from the bottom edges 31a and 32a of the magnet slots 31 and 32 up to the outer edges of the core portion 12 between the magnet slots of the same pole. The curved portions 41 and 42 are of a symmetrical shape bilaterally. Therefore, to simplify the description, the curved portion 41 and its related portions only are described.

In FIG. 4A, the curved portion 41 is so formed as to have a small curvature (large radius of curvature) near the bottom edge 31a (connecting point 41a) and a large curvature (small radius of curvature) near the core portion 12 between the magnet slots of the same pole (connecting point 41b).

FIGS. 5 to 8 are views illustrating embodiments of the present invention. In these drawings, it is desired that the straight lines, curves and arcs of different radii are smoothly linked to each other and are, specifically, connected to each other. In this specification, "connected to each other" means that the tangential line at the connecting point is a tangential line which is in common for the two. Further, FIGS. 5 to 8 do not show the magnets M1, M2 for simplicity.

Therefore, when, for example, arcs of different radii are being linked, it is desired that the two are connected to each other; i.e., the tangential line at the connecting point is a tangential line in common for the two. As a result, the centers of the two arcs are on a straight line, which is perpendicular to the common tangential line and passes through the connecting point. In other words, the center of one arc is present on a straight line that connects the connecting point to the center of another arc.

Further, in the case of the straight line and arc, such a relationship is desired that the radius of arc at the connecting point meets the straight line at right angles therewith.

When other general curve such as part of an ellipse is linking to an arc, it is also desired that the tangential line at the connecting point of the two is the same.

Further, when a straight line is linking to other general curve such as part of an ellipse, it is desired that the straight line is a tangential line to the curve at the connecting point.

Figure 5:
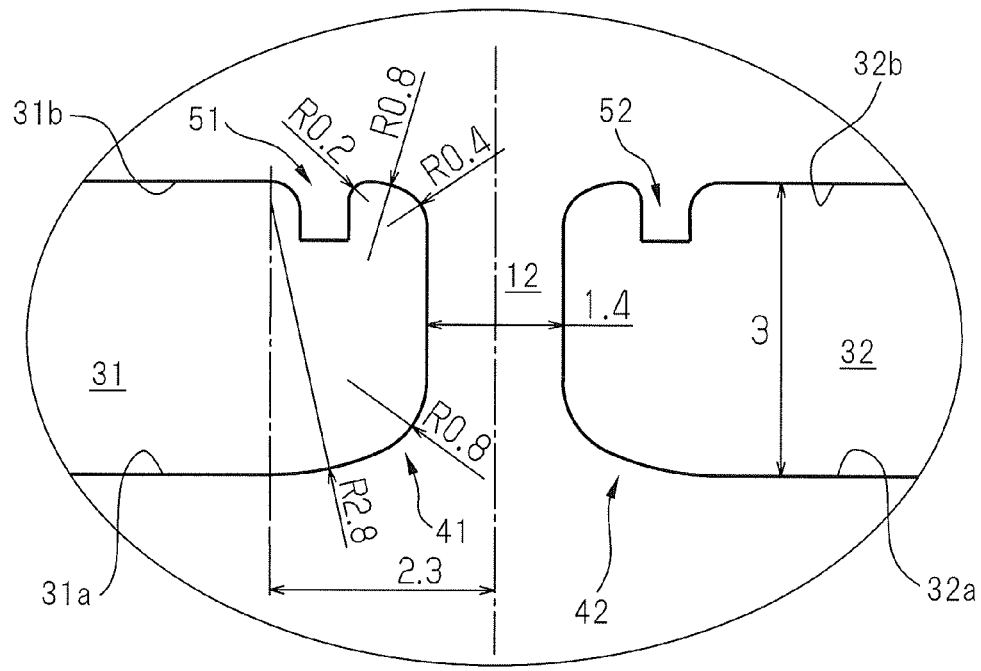
FIG. 5 is a view similar to FIG. 4A and illustrates a first embodiment of the invention.

FIG. 5 is a view illustrating a first embodiment of the invention. In FIG. 5, two arcs of different sizes are forming the curved portion 41. The curved portion 41 formed of the two arcs assumes a simple shape, produces the above-mentioned effect to a large extent and provides practicability to a high degree. Further, specifically preferred state of connection include such relations as two arcs are connected to each other, an arc is connected to the lower edge 31a of the magnet slot 31, and the arc is connected to the outer edge of the core portion 12 between the magnet slots of the same pole.

As can be seen from FIG. 5, the bottom edge 31a of the magnet slot 31 is a tangential line of a first arc of R2.8 (radius of 2.8 mm, hereinafter the same). Then, the first arc of R2.8 is connected to a second arc of R0.8. In other words, the center of the second arc of R0.8 is present on a line of radius R2.8 that passes through a point of connection of the first arc and the second arc. In FIG. 5, further, a straight line is formed by the outer edge of the core portion 12 between the magnet slots of the same pole that connects to the second arc of R0.8, the straight line being a tangential line to the second arc of R0.8.

Figure 6:
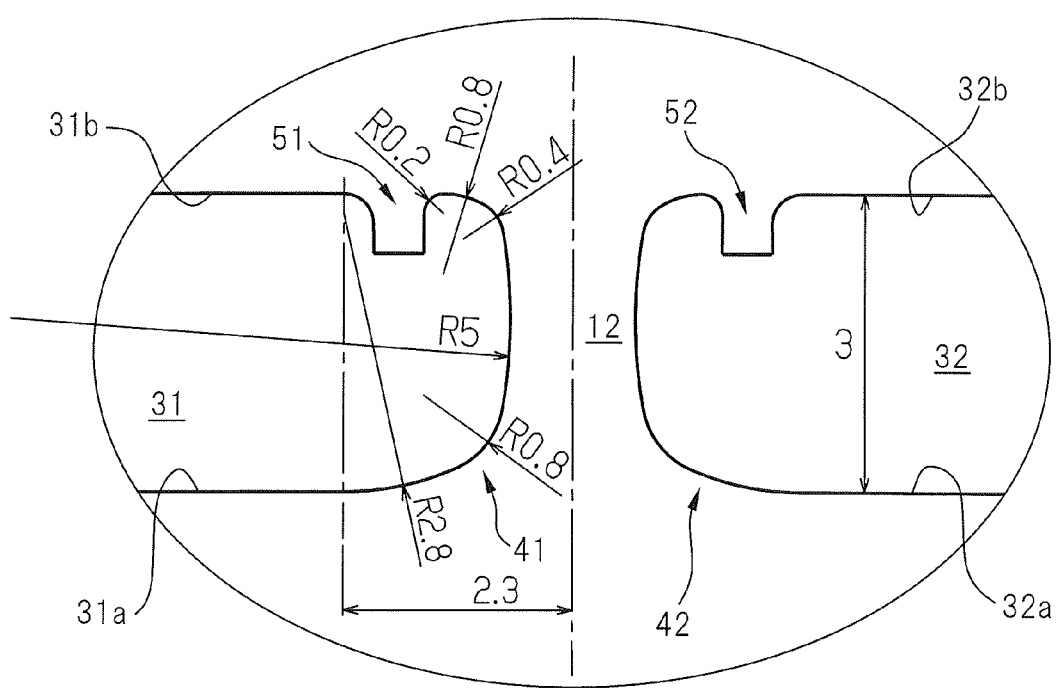
FIG. 6 is a view similar to FIG. 4A and illustrates a second embodiment of the invention.

FIG. 6 is a view illustrating a second embodiment of the invention. In FIG. 6, a curve is formed by the outer edge of the core portion 12 between the magnet slots of the same pole. A first arc of R2.8 connects to the bottom edge 31a of the magnet slot 31, a second arc of R0.8 connects to the first arc and, further, an arc of R5 connects to the second arc, the arcs forming the outer edge of the core portion 12 between the magnet slots of the same pole.

Figure 7:
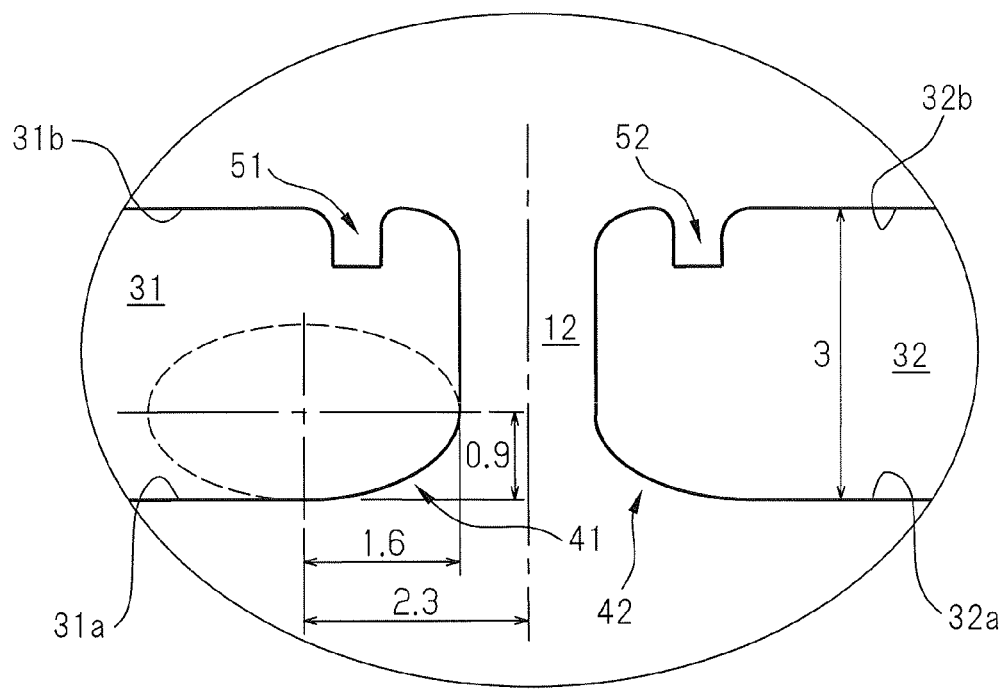
FIG. 7 is a view similar to FIG. 4A and illustrates a third embodiment of the invention.

FIG. 7 is a view illustrating a third embodiment of the invention. FIG. 7 shows another curved portion 41 of which the curvature is gradually increasing from the bottom edge 31a up to the outer edge of the core portion 12 between the magnet slots of the same pole. The curved portion 41 shown in FIG. 7 is corresponding to a quarter of an ellipse that has a long axis of 3.2 mm and a short axis of 1.8 mm. As can be seen from FIG. 7, the bottom edge 31a of the magnet slot 31 and the linear outer edge of the core portion 12 between the magnet slots of the same pole are serving as tangential lines to the quarter of the ellipse.

If a change in the curvature of the embodiment of FIG. 7 is regarded as a gradient of the tangential line, the gradient of the tangential line is 0° at a point of connection to the bottom edge 31a of the magnet slot 31. Then, the gradient of the tangential line monotonously increases toward the outer edge of the core portion 12 between the magnet slots of the same pole. The gradient of the tangential line is 90° at a point of connection to the outer edge of the core portion 12 between the magnet slots of the same pole.

In the embodiment shown in FIG. 7, the gradient of the tangential line is 90° at the outer edge of the core portion 12 between the magnet slots of the same pole. However, the gradient may be an angle other than 90°. Further, the invention encompasses a case where the outer edge of the core portion 12 between the magnet slots of the same pole is not a straight line.

Figure 8:
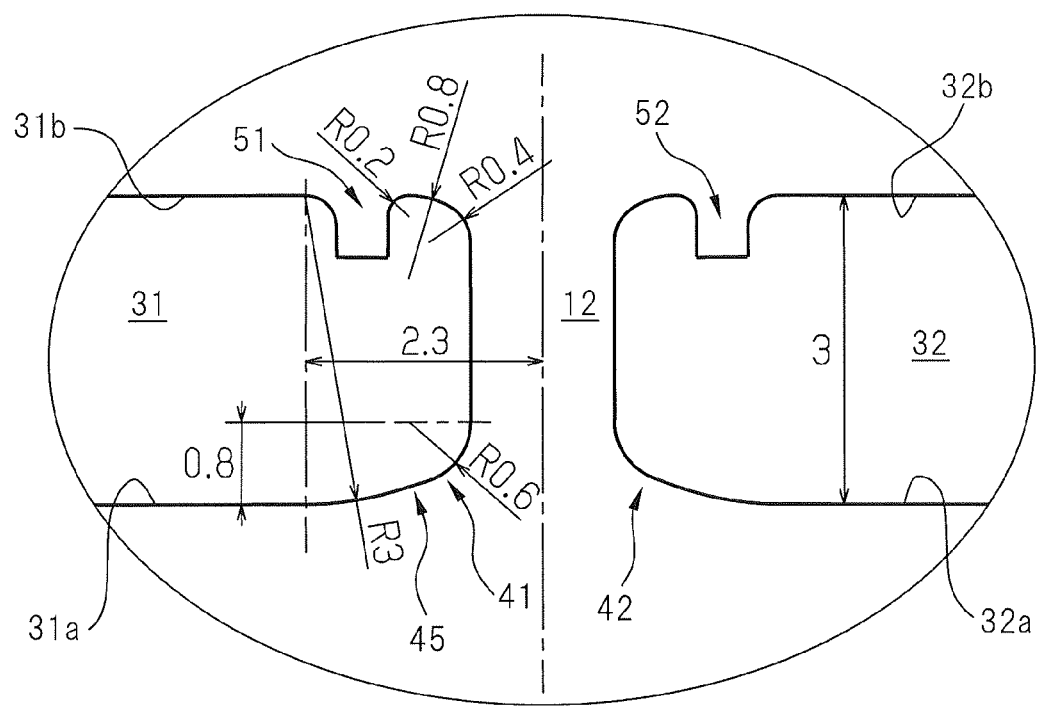
FIG. 8 is a view similar to FIG. 4A and illustrates a fourth embodiment of the invention.

FIG. 8 is a view illustrating a fourth embodiment of the invention. In FIG. 8, the curved portion 41 includes a first arc of R3 connected to the bottom edge 31a of the magnet slot 31, a second arc of R0.6 connected to the outer edge of the core portion 12 between the magnet slots of the same pole, and a linear portion 45 which serves as a common tangential line to the first arc and the second arc.

Figure 14:
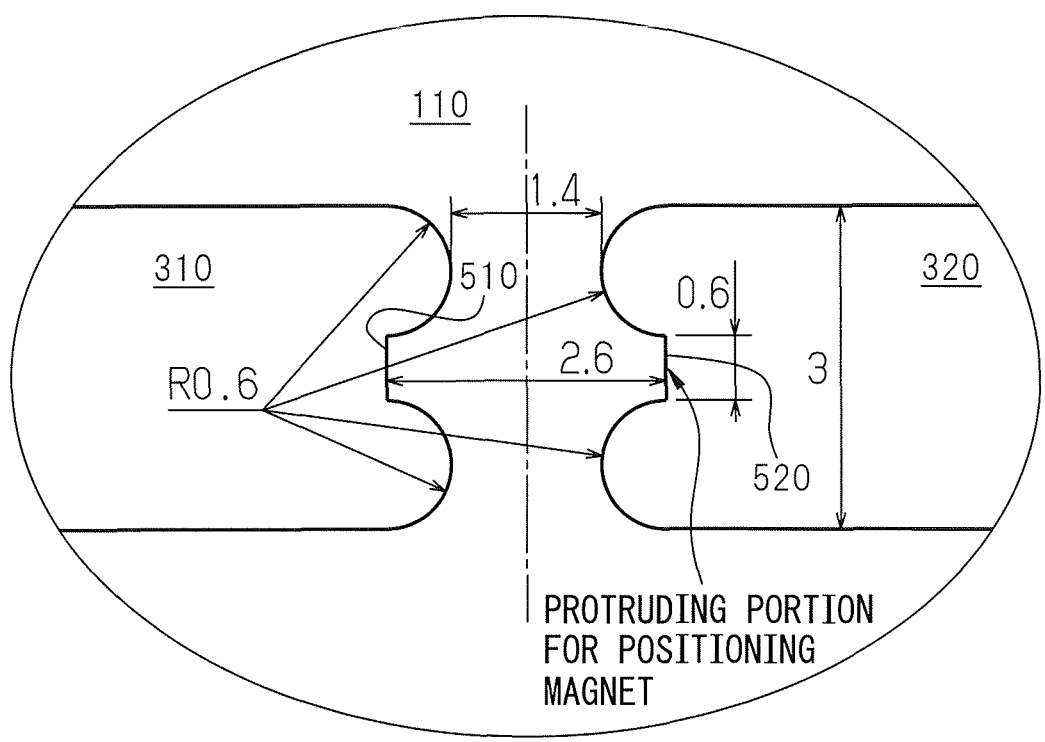
FIG. 14 is a view of sizes of a shape used for the analysis of FIG. 12.

According to the prior art, the magnets M1 and M2 are positioned being directly contacted to the core portion 120 between the magnet slots of the same pole or due to magnet-positioning protuberances 510, 520 provided on the core portion 120 between the magnet slots of the same pole as shown in FIG. 14.

However, in the present invention, the wall surfaces of the bottom edges 31a, 31b of magnet slots 31, 32 are forming very mildly curved portions 41, 42 toward the core portion 12 between the magnet slots of the same pole. When the magnets M1, M2 are inserted in the magnet slots 31, 32, respectively, in producing the rotor 10, it is probable that the magnets M1, M2 may ride on the very mildly curved portions 41, 42 and may, hence, slightly float over the bottom edges 31a, 32a. Such a state is not desirable from the standpoint of performance of the rotor 10. In other words, it is not recommended to use the curved portions 41, 42 for positioning the magnets M1, M2. Further, for attaining performance of the rotor 10, the magnets M1, M2 must be positioned maintaining a suitable degree of precision. Therefore, it is, necessary to provide a particular shape for positioning the magnets M1 and M2.

According to the present invention as can be seen by making a reference again to FIG. 4A and other Figures, protruding portions 51, 52 are formed on the upper edges 31b, 32b of the magnet slots 31, 32 so as to extend toward the bottom edges 31a, 32a, respectively. The protruding portions 51, 52 are arranged on the upper edges 31b, 32b at positions corresponding to the points 41a of connection to the curved portions 41. The protruding portions 51, 52 are used for positioning the magnets M1, M2. In FIG. 4, the gaps between the magnet slots 31, 32 and the magnets M1, M2 are minimum gaps necessary from the standpoint of work, and are, usually, in a range of from about 0.01 mm to about 0.3 mm. The gaps are better small from the standpoint of magnetic characteristics.

According to the prior art (not shown) in which the protruding portions 510, 520 for positioning are provided on the core portion 12 between the magnet slots of the same pole, relaxation of stress is disturbed near the protruding portions 510, 520. On the contrary, when the protruding portions 51, 52 are formed on the upper edges 31b, 32b of the magnet slots 31, 32 as shown in FIG. 4A and other Figures, the magnets M1, M2 in the magnet slots 31, 32 come into contact with the protruding portions 51, 52, and can be reliably positioned. When the inner diameter of the rotor is also increased, a change in the stress near the upper edges 31b, 32b of the magnet slots 31, 32 on the outer side in the radial direction is smaller than a change in the stress near the bottom edges 31a, 32a of the magnet slots 31, 32 on the inner side in the radial direction. Therefore, even if the protruding portions 51, 52 are provided on the upper edges 31b, 32b which are on the outer side in the radial direction, stress does not concentrate near the protruding portions 51, 52. Therefore, according to the present invention, the magnets M1, M2 can be positioned maintaining stability.

Figure 9:
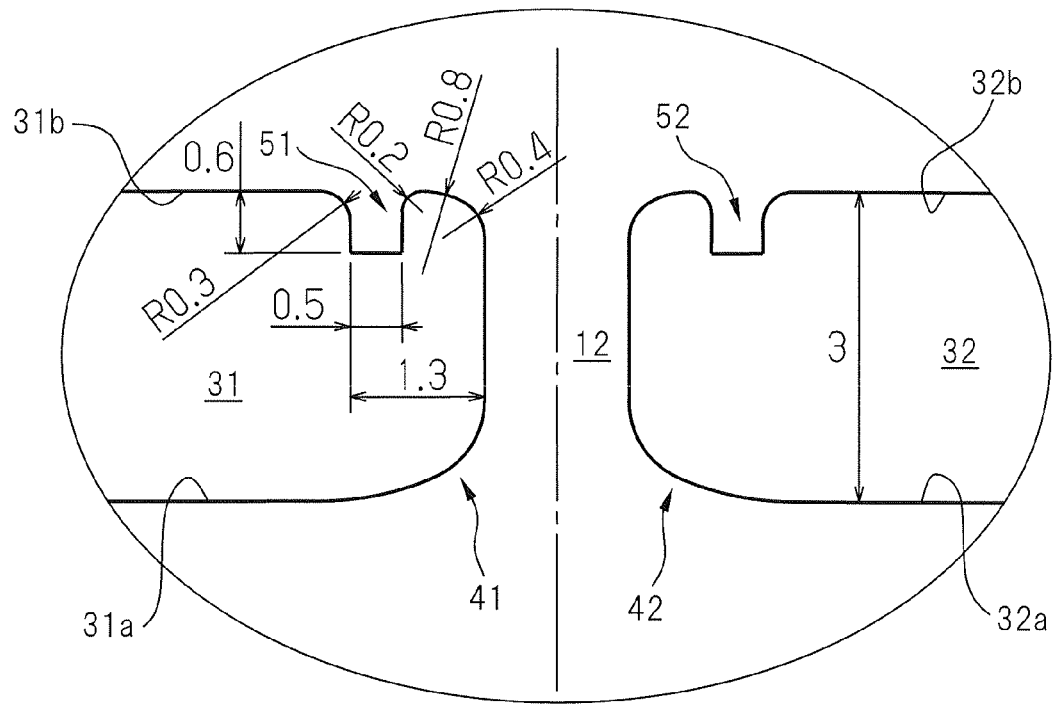
FIG. 9 is a view showing sizes near protruding portions.

Referring to FIG. 4A and other Figures, it is desired that the corners R of the regions between the protruding portions 51, 52 and the upper edges 31b, 32b correspond to, or smaller than, the corners of the magnets M1, M2. Referring to FIG. 9 showing sizes near the protruding portions, an arc of R0.3 is shown between the upper edge 31b and the protruding portion 51.

Further, referring to FIG. 4A and other Figures, it is desired that a plurality of arcs of different sizes are included in the roots of protruding portions 51, 52 and in the connection portions between the protruding portions 51, 52 and the outer edges of the core portions 12 between the magnet slots of the same pole. FIG. 9 shows a first arc of R0.2, a second arc of R0.8 and a third arc of R0.4 in this order from the protruding portions 51, 52 toward the outer edges of the core portion 12 between the magnet slots of the same pole. In order to avoid undesired concentration of stress, it is desired that the protruding portions 51, 52 are connected to the outer edges of the core portion 12 between the magnet slots of the same pole through geometrical relationships connected to each other. In this connection, attention should be given to the fact that the stress in these portions is smaller than the stress in the inner core portion 11a, and the shape is allowed to have a large degree of freedom.

Figure 4B:
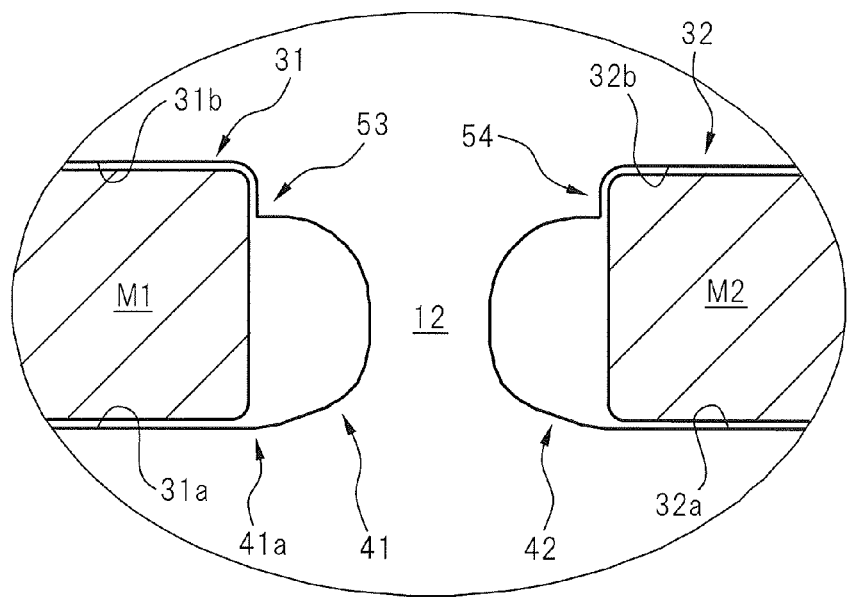
FIG. 4B is another enlarged view showing, on an enlarged scale, the core portion between magnet slots of the same pole.

FIG. 4B is another enlarged view showing, on an enlarged scale, the core portion between the magnet slots of the same pole. In FIG. 4B, steps 53 and 54 are formed on the upper edges 31b and 32b of the magnet slots 31 and 32 to extend toward the bottom edges 31a and 32a, respectively. The steps 53 and 54 are provided on the upper edges 31b and 32b at positions corresponding to the point 41a of connection to the curved portion 41. As can be seen from FIG. 4B, the ends of the magnets M1 and M2 are contacted to the steps 53 and 54; i.e., the steps 53 and 54 are used for positioning the magnets M1 and M2.

Figure 10:
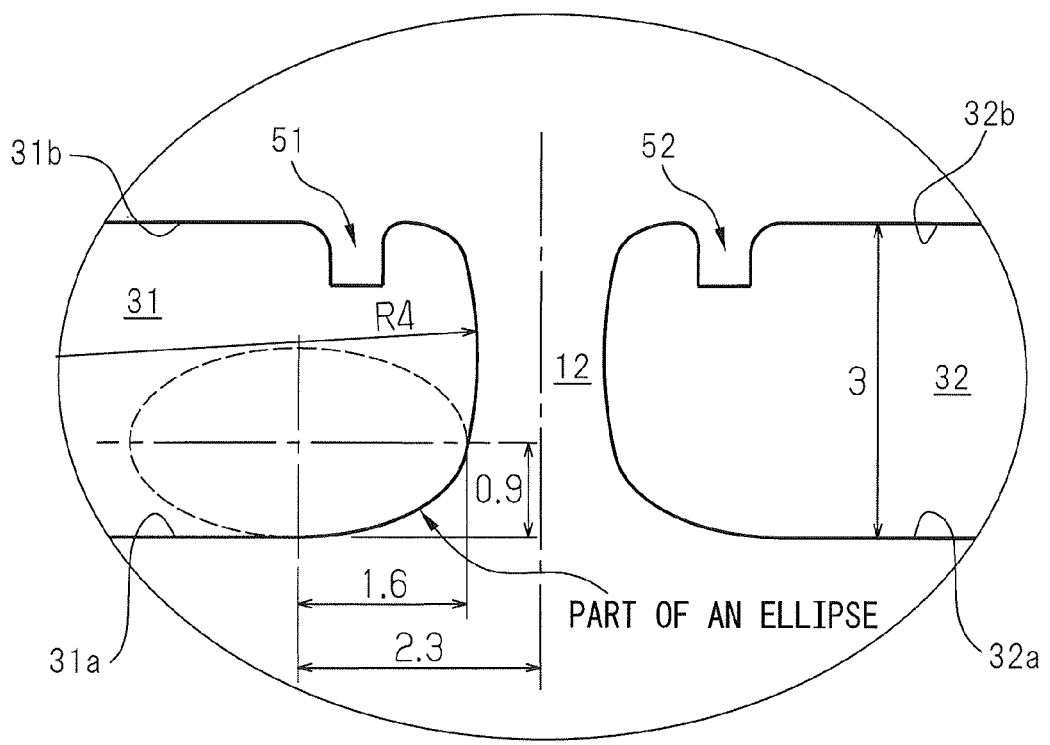
FIG. 10 is a view similar to FIG. 4A and illustrates a further embodiment of the invention.

FIG. 10 is a view illustrating a further embodiment of the invention. FIG. 10 is a modified example of FIG. 7 and in which the outer edge of the core portion 12 between the magnet slots of the same pole is not a straight line but is an arc of R4. As can be seen from FIG. 10, the arc of R4 is forming part of a circumscribed circle that contacts to the above-mentioned ellipse at a point of connection to the ellipse. The ellipse connects to the bottom edge 31a of the magnet slot 31 and has its curvature increasing toward the outer edge of the core portion 12 between the magnet slots of the same pole. The ellipse that is shown has a long axis of 3.2 mm and a short axis of 1.8 mm.

Figure 11:
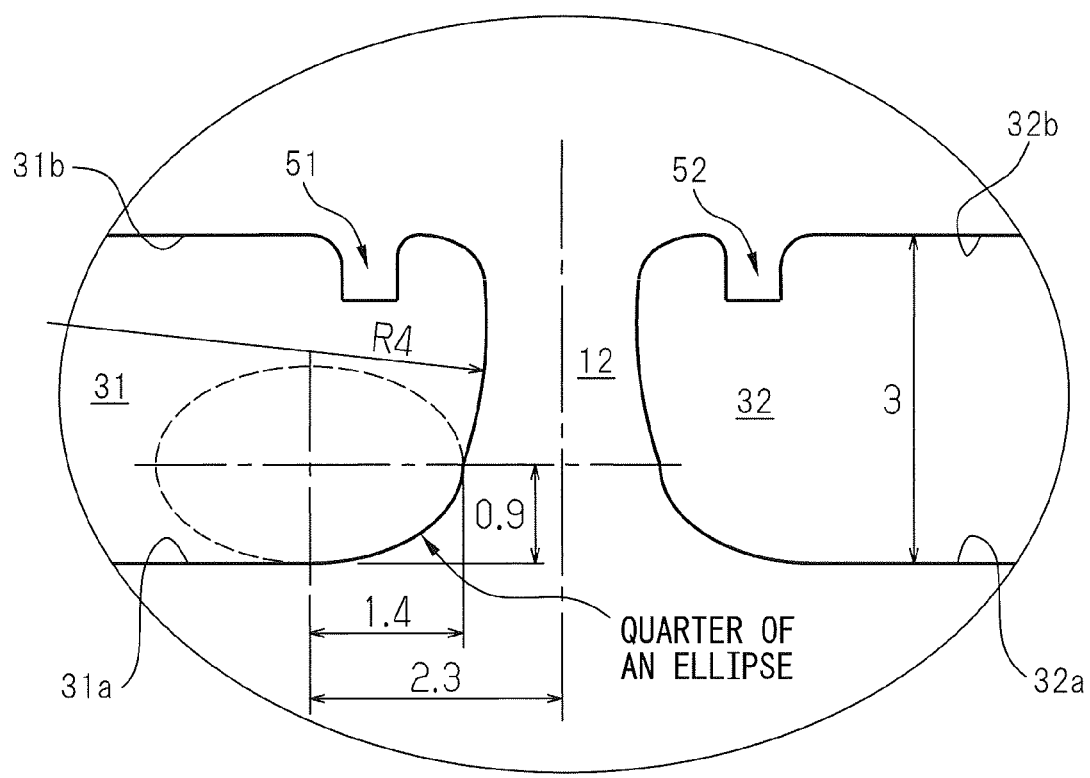
FIG. 11 is a view similar to FIG. 4A and illustrates a still further embodiment of the invention.

FIG. 11 is a view illustrating a further embodiment of the invention. FIG. 11 is a modified example of FIG. 7 in which the outer edge of the core portion 12 between the magnet slots of the same pole is not a straight line but is an arc of R4. The arc of R4 intersects the ellipse at a portion of a maximum long axis thereof. As described above, the ellipse connects to the bottom edge 31a of the magnet slot 31 and has its curvature increasing toward the core portion 12 between the magnet slots of the same pole. The ellipse that is shown has a long axis of 2.8 mm and a short axis of 1.8 mm. FIG. 11 shows only a quarter of the ellipse.

In the embodiment shown in FIG. 11, the bottom edge 31a of the magnet slot 31 and the ellipse are in a "contacting" relationship at a connection portion on the side of the bottom edge 31a of the magnet slot 31 where stress tends to easily concentrate. On the contrary, the outer edge of the core portion 12 between the magnet slots of the same pole and the ellipse have some margin in the stress and, therefore, are not in a "contacting" relationship. As shown in the embodiment of FIG. 11, the outer edge of the core portion 12 between the magnet slots of the same pole and the curved portion 41 may be connected to each other leaving an intersecting point.

Figure 12:
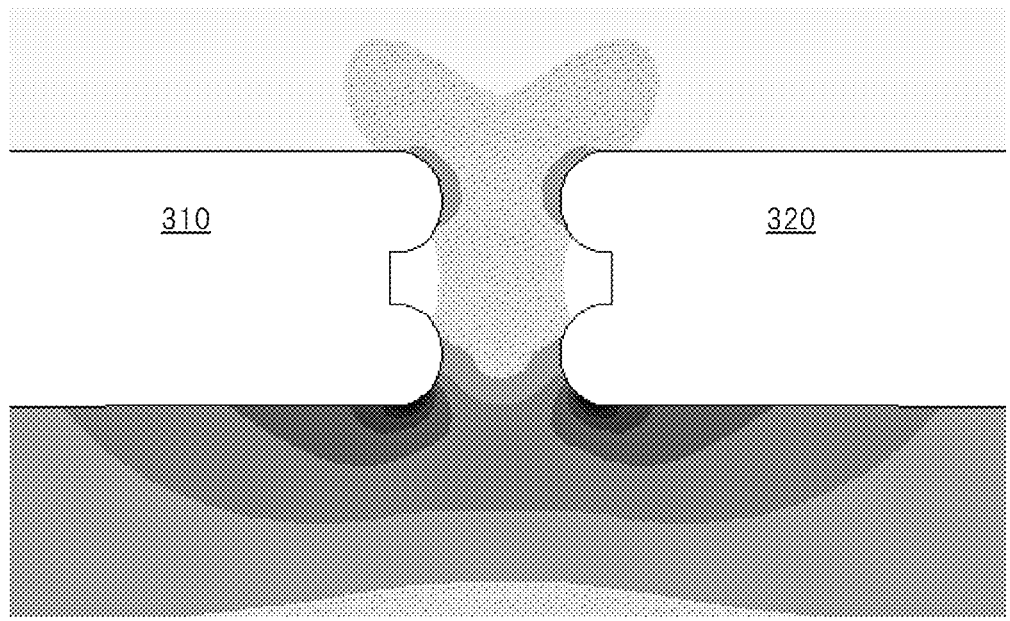
FIG. 12 is a view showing the results of finite element analysis to demonstrate the distribution of stress in a shape according to a prior art.
Figure 13:
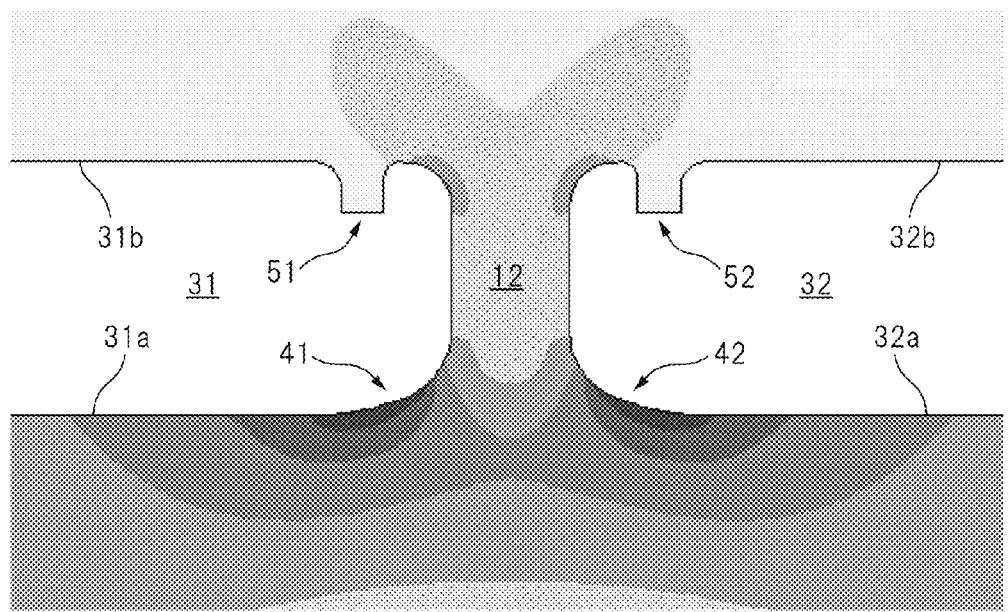
FIG. 13 is a view showing the results of finite element analysis to demonstrate the distribution of stress in a shape according to the present invention.

The effects of these embodiments will be compared based on a finite element analysis. FIG. 12 is a view showing the results finite element analysis to demonstrate the distribution of stress in a shape according to the prior art. The sizes of the shape are shown in FIG. 14. FIG. 13 is a view showing the results of finite element analysis to demonstrate the distribution of stress in a shape according to the present invention. The sizes of the shape shown in FIG. 13 are as shown in FIG. 5. In FIGS. 12 and 13, the portions of dense colors represent larger stresses. The conditions for analysis were as shown in Table 1.

TABLE 1

| | Prior art: FIG. 12 | This invention: FIG. 13 |
|---|---|---|
| Drawings of sizes | FIG. 14 | FIG. 5 |
| Analytical rotational speed | 12000 min⁻¹ | |
| Number of poles | 8 | |
| Outer diameter of rotor | φ132 mm | |
| Inner diameter of rotor | φ104 mm | |
| Magnet size (thickness × width) | 19.5 mm wide, 3.0 mm thick | |
| Analytical results: max. value | 350 MPa | 233 MPa |

In FIG. 12, the lower side is the rotary shaft side. As can be seen from FIG. 12, on the outer edges of the core portion between the magnet slots of the same pole, stress is becoming large specifically near the portions connecting to the bottom edges of the magnet slots 310, 320 on the side of the rotary shaft. As described above, this tendency becomes conspicuous as the inner diameter of the core increases. Specifically, the value of stress sharply increases near the bottom edges of the magnet slots having a small radius of curvature as shown in FIG. 12. In other words, from the analytical results of FIG. 12, it will be learned that according to the shape of the prior art, the portion where stress concentrates has a small radius of arc, and in the portion, the concentration of stress is not sufficiently suppressed. As a result, stress concentrates in a narrow area and a value of stress increases.

Referring to FIG. 13, it will be learned that the stress is increasing in the curved portions 41, 42 between the bottom edges 31a, 32a of the magnet slots 31, 32 and the outer edges of the core portion 12 between the magnet slots of the same pole. Specifically, the stress increases immediately after having entered into the curved portions 41, 42 from the bottom edges 31a, 32a of the magnet slots 31, 32. However, as shown in Table 1, an extreme value of stress of FIG. 13 is 233 MPa while an extreme value of stress of FIG. 12 is 350 MPa. In other words, the shape of the present invention is more effective in suppressing the stress.

If a rotor of the shape shown in FIG. 12 is fabricated by using a core of a material of a fatigue limit of, for example, 300 MPa and is rotated at an analytical rotational speed of 12000 rpm, then the core is probable to be broken. In this case, the rotational speed must be lowered. On the contrary, even if the rotor 10 of the shape shown in FIG. 13 fabricated by using the core of the same material is rotated at an analytical rotational speed of 12000 rpm, the core still has a margin in the strength. In other words, the shape of the present invention makes it possible to further increase the rotational speed.

In other words, the constitution of the present invention makes it possible to suppress the stress near the bottom edges 31a, 32a of the magnet slots 31, 32 in the outer edges of the core portion 12 between the magnet slots of the same pole. As a result, the rotor of a buried magnet-type synchronous motor can be realized attaining a higher rotational speed, and, at the same time, a larger inner diameter, than those of the prior art.

According to the results of finite element analysis of FIGS. 12 and 13, the value of stress is small in the upper edges of the magnet slots near the core portion 12 between the magnet slots of the same pole in the shape of either FIG. 12 or FIG. 13. Therefore, even if magnet-positioning protruding portions 51, 52 are provided on the upper edges 31b, 32b of the magnet slots 31, 32, the value of stress does not specifically increase near the protruding portions 51, 52. To begin with, the value of stress near the upper edges 31b, 32b of the magnet slots 31, 32 is smaller than the value of stress near the bottom edges 31a, 32a. Therefore, based on the above, the strength is not affected even if the protruding portions 51, 52 are formed on the upper edges 31b, 32b of the magnet slots 31, 32.

In other words, provision of the magnet-positioning protruding portions 51, 52 on the upper edges 31b, 32b of the magnet slots 31, 32 as shown in FIG. 13, is advantageous making it possible not only to reliably position the magnets but also to increase a maximum rotational speed of the rotor 10.

In FIGS. 12 and 13, the angle subtended by the magnet slots of the same pole is roughly 180°. For the rotor 10 which is required to possess a large inner diameter, the angle is most desirably 180°, and is at least about 180°±10° from the standpoint of strength.

It is important that non-core portions on both sides of the rows of magnets in the direction of rotation are non-magnetic and are, usually, cavities, which, however, need not necessarily be cavities. Further, depending upon the method of fixing the magnets, the cavities in the non-core portions may be filled with a resin or an adhesive.

According to the present invention as can be seen from the drawings, the magnets M1 and M2 are slightly separated away from the core portion 12 between the magnet slots of the same pole. Therefore, the centers of gravity of the magnets M1 and M2 are slightly separated away from each other as compared to the structure of the prior art. Accordingly, slightly decreased loads are exerted on the core portion 12 between the magnet slots of the same pole. However, the effect is so small that the present invention is not at all affected.

Referring to FIG. 4A, the protruding portions 51 and 52 are of a rectangular shape in longitudinal cross section, and are simply extending from the upper edges 31b, 32b of the magnet slots 31, 32 toward the bottom edges 31a, 32a. With such a simple shape, it is probable that the magnets M1, M2 are locally short-circuited by part of the magnetic flux. In such a case, a large demagnetizing filed is locally produced. To prevent this, the thickness of the magnets M1, M2 may be increased. However, an increase in the thickness of the magnets M1, M2 makes it difficult to achieve a high-speed rotation and to increase the inner diameter of the rotor 10 as well.

Figure 15A:
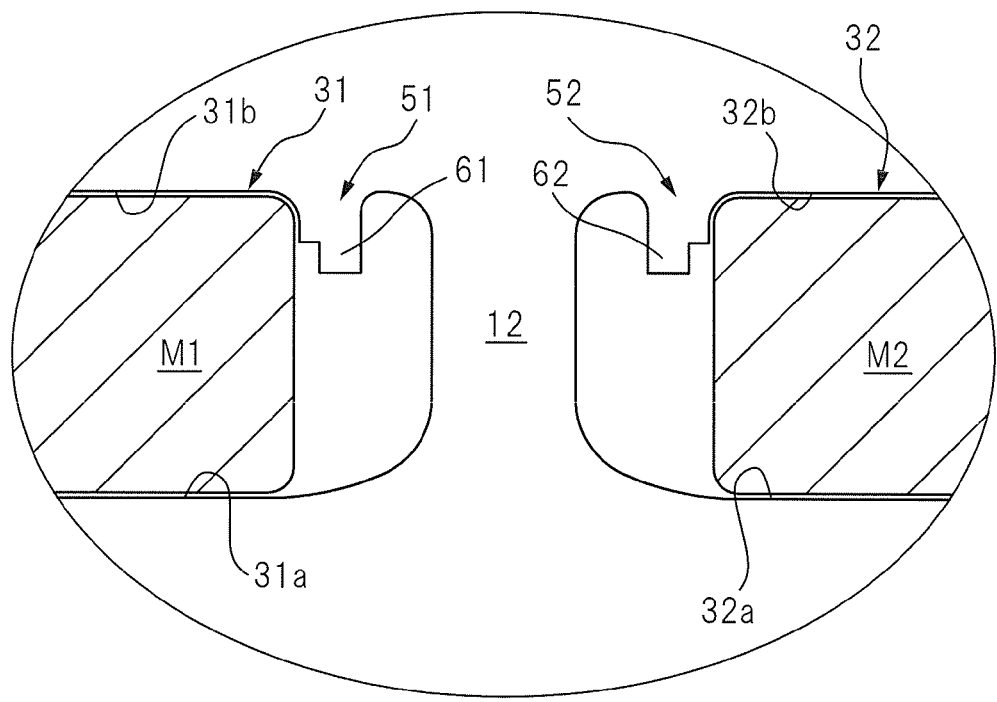
FIG. 15A is an enlarged view showing, on an enlarged scale, the core portion between magnet slots of the same pole according to another embodiment.
Figure 15B:
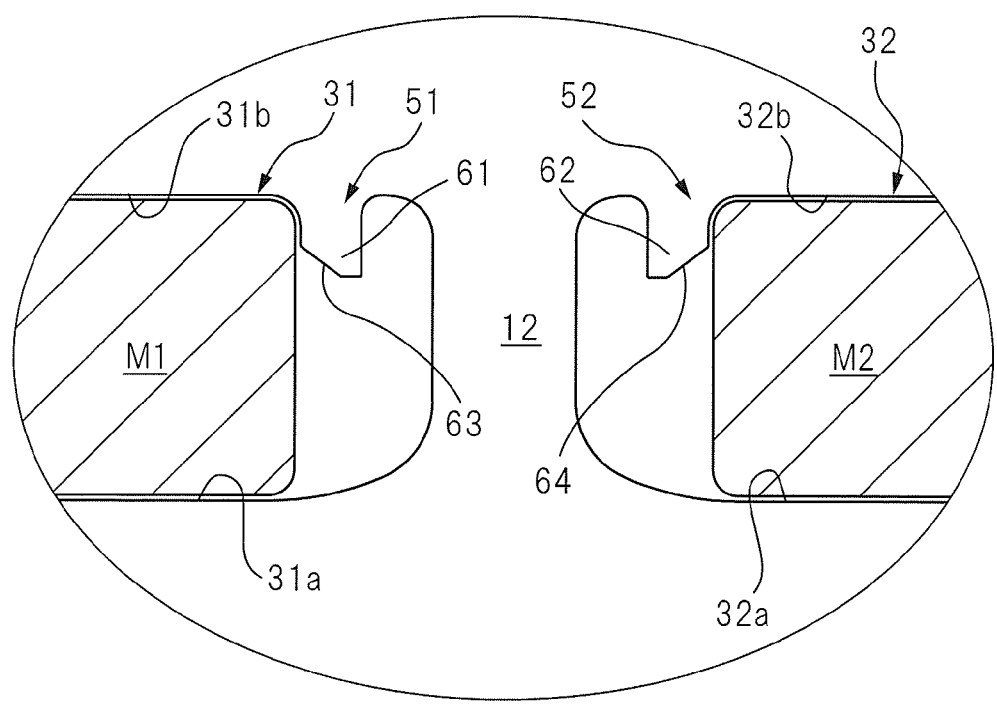
FIG. 15B is another enlarged view showing, on an enlarged scale, the core portion between magnet slots of the same pole according to a further embodiment.

Therefore, further embodiments preferably employ the constitutions shown in FIGS. 15A and 15B which are enlarged views showing, on an enlarged scale, the core portion between the magnet slots of the same pole. In these drawings, partly protruding portions 61, 62 are further formed on the protruding portions 51, 52 so as to partly protrude from the tip ends of the protruding portions 51, 52 in a direction in which the protruding portions 51, 52 are protruding.

In FIG. 15A, the partly protruding portions 61, 62 have a rectangular shape in longitudinal cross section and in FIG. 15B, the partly protruding portions 61, 62 have nearly a triangular shape in longitudinal cross section. Therefore, the partly protruding portions 61, 62 in FIG. 15B include tilted edges 63, 64 that are tilting in the direction of thickness of the magnets M1, M2. It will be understood that the partly protruding portions 61, 62 having tilted edges 63, 64 can be easily formed as compared to forming the partly protruding portions 61, 62 of a rectangular shape in longitudinal cross section.

As can be seen from FIGS. 15A and 15B, the partly protruding portions 61, 62 are extending along one edge of the protruding portions 51, 52 that are not neighboring the magnets M1, M2. Therefore, although the protruding portions 51, 52 are neighboring the magnets M1, M2, the partly protruding portions 61, 62 are relatively separated away from the magnets M1, M2.

The partly protruding portions 61, 62 assuming such a shape serve to reduce the magnetic flux that locally short-circuits the magnets M1, M2. Therefore, the intensity of a local demagnetizing field is reduced. Further, as described with reference to FIGS. 4A and 4B, it is also allowable to attain both a high-speed rotation of the rotor 10 and a large inner diameter thereof.

Then, the effects of these embodiments will be compared relying on the analysis of finite elements.

Figure 16A:
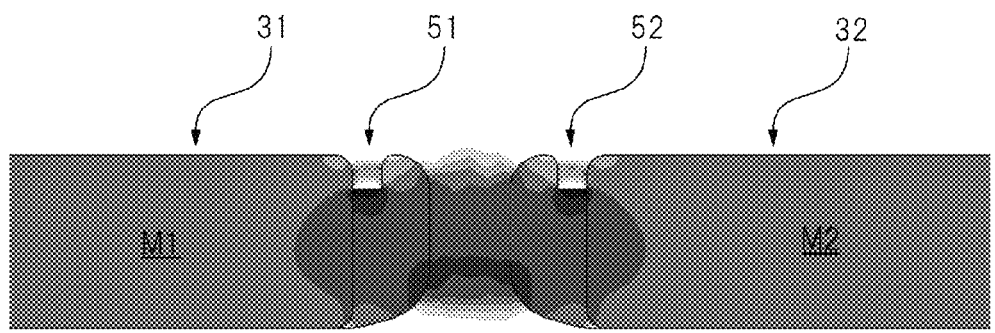
FIG. 16A is a view showing the results of finite element analysis to demonstrate the distribution of magnetic field in the shape of FIG. 4A.
Figure 16B:
FIG. 16B shows the results of analysis of the magnet portions only picked up from the results shown in FIG. 16A.

FIG. 16A is a view showing the results of finite element analysis to demonstrate the distribution of magnetic field in the shape of FIG. 4A, and FIG. 16B shows the magnet portions only in the results shown in FIG. 16A. Similarly, FIG. 16C is a view showing the results of finite element analysis to demonstrate the distribution of magnetic field in the shape of FIG. 15A, and FIG. 16D shows the magnet portions only in the results shown in FIG. 16C.

Figure 16C:
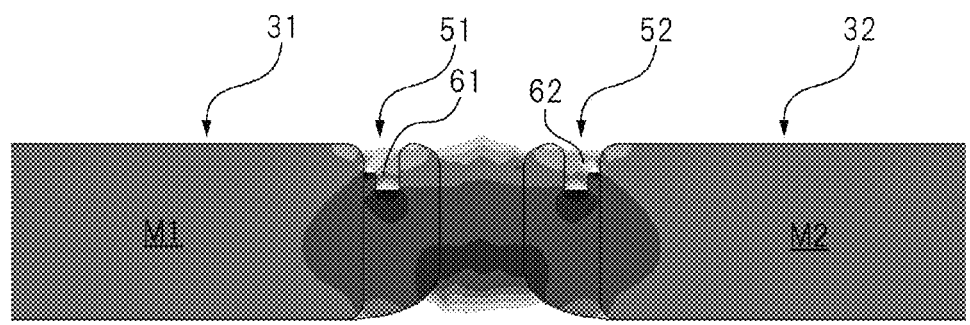
FIG. 16C is a view showing the results of finite element analysis to demonstrate the distribution of magnetic field in the shape of FIG. 15A.
Figure 16D:
FIG. 16D shows the results of analysis picked up from the magnet portions only in the results shown in FIG. 16C.
Figure 17:
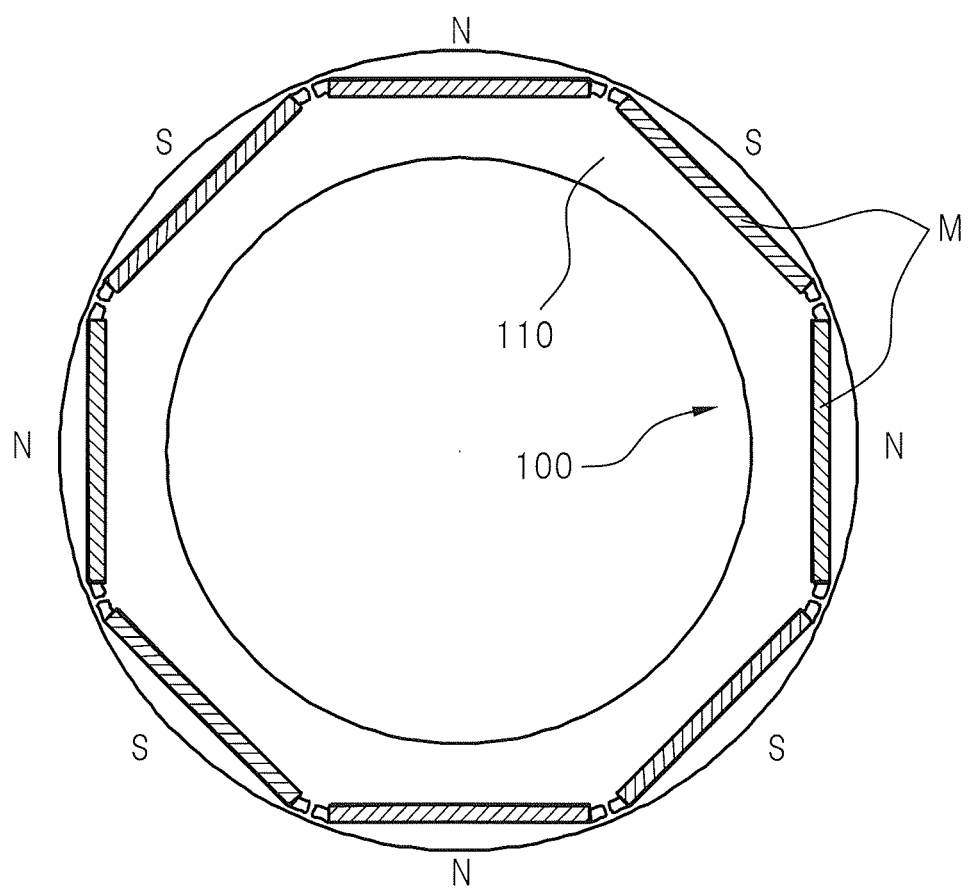
FIG. 17 is a transverse sectional view showing the shape of representative magnet slots in a buried magnet-type synchronous motor according to a prior art.
Figure 18:
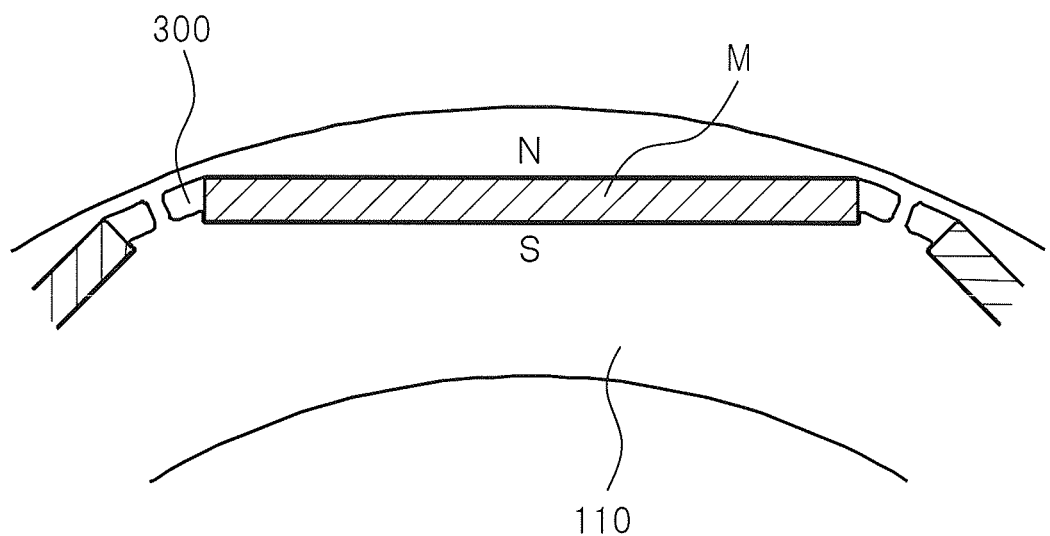
FIG. 18 is a partial enlarged view showing, on an enlarged scale, one pole of the motor shown in FIG. 17.
Figure 19:
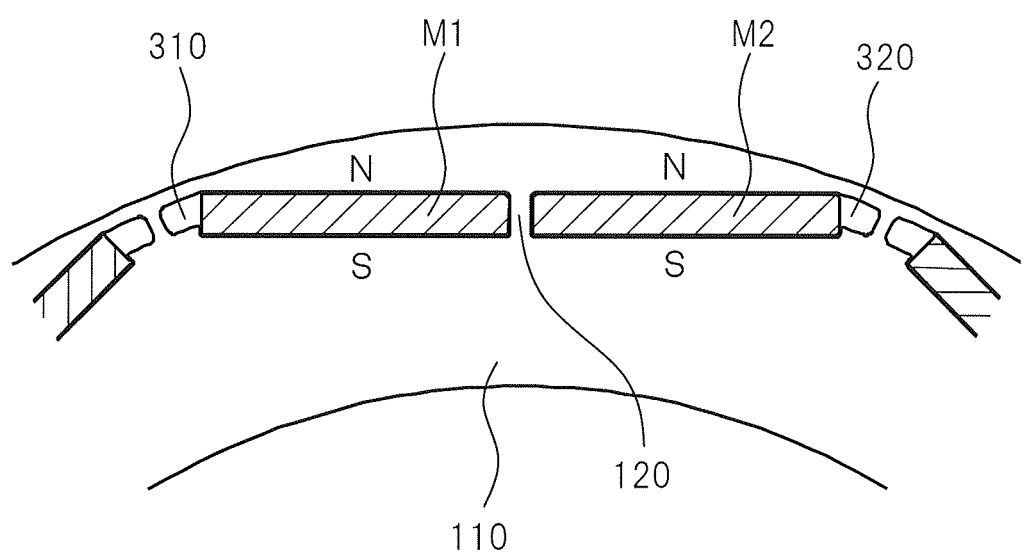
FIG. 19 is another sectional view showing the shape of representative magnet slots in the buried magnet-type synchronous motor according to the prior art.

In FIGS. 16A and 16C and in FIGS. 16B and 16D, the ranges of magnetic fields are also shown for comparison and in which the areas of dense colors represent more intense demagnetizing fields.

In FIG. 16A, the greatest magnetic field occurs at points where the magnets M1, M2 intersect the bottom edges of the protruding portions 51, 52. On the contrary, in FIG. 16C, the greatest magnetic field occurs in the partly protruding portions 61, 62. In other words, in FIG. 16C, the positions where the greatest magnetic field is occurring are separated away from the magnets M1, M2 as compared to FIG. 16A.

As a result, a decreased magnetic flux takes part in short-circuiting the magnet portions and in FIG. 16D, the demagnetizing field is decreasing as compared to FIG. 16B. According to the analysis, the demagnetizing field occurring in the magnets M1, M2 is 1073 kA/m in FIG. 16B while it is decreased down to 908 kA/m in FIG. 16D.

That is, when the constitution of FIG. 15A which is an embodiment of the invention is employed for the shape of FIG. 4A, it is possible to further decrease the thickness of the magnets when the same demagnetizing performance is to be realized. This makes it possible to further increase the speed or further increase the inner diameter, which is advantageous.

Further, the rotor 10 based on the present invention is mounted on the electric motor. The electric motor is desirably used for driving the main shaft of a machine tool. In this case, the main shaft of the machine tool can be rotated at a higher speed without decreasing the diameter of the main shaft, i.e., without lowering the rigidity of the main shaft. Namely, upon employing the motor equipped with the rotor 10 of the present invention, it will be understood that there is provided a machine tool that features a higher rotational speed and a larger inner diameter maintaining a high degree of machining precision.

Effects of the Invention

In the first to third embodiments, a curve or an arc having a relatively large radius of curvature is positioned near the edges on the inner side in the radial direction. This makes it possible to suppress the stress near the bottom edges of the magnet slots in the outer edges of the core portion between the magnet slots of the same pole. Therefore, it is possible to obtain a rotor of the buried magnet-type synchronous motor achieving a higher speed, and, at the same time, a larger inner diameter, than the prior art.

In the fourth embodiment, the magnets in the magnet slots are contacted to the protruding portions or the steps so as to be reliably positioned. Even in case the rotor has an increased inner diameter, a change in the stress near the edges of the magnet slots on the outer side in the radial direction is smaller than a change in the stress near the edges of the magnet slots on the inner side in the radial direction. Therefore, even if the protruding portions or the steps are formed on the edges on the outer side in the radial direction, the stress does not concentrate near the protruding portions or the steps. Accordingly, the magnets can be positioned maintaining stability.

In the fifth, sixth, ninth and tenth embodiments, the electric motor mounting the above rotor is applied to the main shaft of a machine tool. This enables the main shaft of the machine tool to rotate at a higher speed without decreasing the diameter of the main shaft, i.e., without decreasing the rigidity of the main shaft. It is, therefore, possible to provide a machine tool that is capable of rotating at a higher speed yet maintaining a high degree of machining precision.

In the seventh embodiment, the magnetic flux that may locally short-circuit the magnets is decreased making it possible to attain a high rotational speed of the rotor as well as to increase the inner diameter thereof while decreasing local demagnetizing field.

In the eighth embodiment, the partly protruding portions can be more easily formed than when the partly protruding portions have a rectangular shape in longitudinal cross section.

Although the present invention was described above by way of typical embodiments, it should be noted that the above-mentioned modifications, various other modifications, omissions and additions can be made by people skilled in the art without departing from the scope of the present invention.

The invention claimed is:

1. A rotor of a buried magnet-type electric motor, said rotor comprising:
    magnetic poles each including two rows of magnets of the same pole wherein the two rows of magnets are placed side by side; and
    a core including, for each of the magnetic poles,
        magnet slots in which said two rows of magnets are arranged, and
        a core portion between the magnet slots,
        wherein each of the magnet slots includes:
            a bottom edge on an inner side in a radial direction of the rotor, and
            connecting portions that connect the bottom edge to a corresponding outer edge of the core portion,
        wherein said connecting portions include:
            a first curved portion having a smaller curvature and connected to the bottom edge, and
            a second curved portion having a larger curvature and connected to the corresponding outer edge of said core portion,
        wherein a first tangential line at a first connecting point between the first curved portion and the bottom edge is a tangential line common for the first curved portion and the bottom edge, and
        wherein a second tangential line at a second connecting point between the second curved portion and the corresponding outer edge of the core portion is a tangential line common for the second curved portion and the corresponding outer edge of the core portion.

2. The rotor of the electric motor according to claim 1, wherein said connecting portions are constituted by a plurality of continuing arcs having radii decreasing from said bottom edge toward the corresponding outer edge of said core portion.

3. The rotor of the electric motor according to claim 1, wherein said connecting portions are constituted by a plurality of arcs or curves and at least one straight line, said plurality of arcs or curves having curvatures increasing from said bottom edge toward the corresponding outer edge of said core portion.

4. An electric motor mounting the rotor of claim 1.

5. A machine tool mounting the electric motor of claim 4.

6. The rotor of the electric motor according to claim 1, wherein each of the magnet slots further includes an upper edge on an outer side in the radial direction, and the upper edge includes a protruding portion extending toward the bottom edge of said magnet slot.

7. The rotor of the electric motor according to claim 6, wherein at least one partly protruding portion is formed on said protruding portion so as to further partly protrude from a tip end of said protruding portion that is not neighboring the magnet arranged in said magnet slot.

8. The rotor of the buried magnet-type electric motor according to claim 7, wherein said partly protruding portion includes a tilted edge that is tilted with respect to the radial direction.

9. An electric motor mounting the rotor of claim 7.

10. A machine tool mounting the electric motor of claim 9.

* * * * *